(12) United States Patent
Parker

(10) Patent No.: US 8,181,284 B1
(45) Date of Patent: May 22, 2012

(54) MOBILE SANITARY URINAL AND METHOD OF USE THEREOF

(76) Inventor: Thomas K. Parker, Allen, TX (US)

( * ) Notice: Subject to any disclaimer, the term of this patent is extended or adjusted under 35 U.S.C. 154(b) by 999 days.

(21) Appl. No.: 12/215,451

(22) Filed: Jun. 27, 2008

Related U.S. Application Data

(60) Provisional application No. 60/937,472, filed on Jun. 29, 2007.

(51) Int. Cl.
  *B60R 15/04* (2006.01)
(52) U.S. Cl. ............. 4/458; 4/144.3; 4/463; 4/301
(58) Field of Classification Search ........ 4/463, 301, 4/144.1, 144.2, 144.3, 144.4, 484, 449, 458, 4/460, 483, 479, 321; 604/317, 322–326
See application file for complete search history.

(56) References Cited

U.S. PATENT DOCUMENTS

| | | | | |
|---|---|---|---|---|
| 3,471,869 A | * | 10/1969 | Segal | 4/453 |
| 3,757,357 A | * | 9/1973 | Smith | 4/458 |
| 3,928,875 A | * | 12/1975 | Persson | 4/451 |
| 4,305,164 A | * | 12/1981 | Sargent et al. | 4/462 |
| 4,844,415 A | * | 7/1989 | Nielsen et al. | 251/325 |
| 5,117,511 A | * | 6/1992 | Smith | 4/114.1 |
| 5,285,532 A | * | 2/1994 | Sealy | 4/144.3 |
| 5,309,578 A | * | 5/1994 | Temple, Sr. | 4/144.3 |
| 5,331,689 A | * | 7/1994 | Haq | 4/144.1 |
| D354,122 S | | 1/1995 | Carlier | |
| 5,551,097 A | | 9/1996 | Short | |
| 5,655,229 A | | 8/1997 | Horn | |
| 5,701,612 A | * | 12/1997 | Daneshvar | 4/144.3 |
| 5,848,443 A | | 12/1998 | Waugh | |
| 5,894,608 A | | 4/1999 | Birbara | |
| 5,946,742 A | * | 9/1999 | Parker | 4/458 |
| 6,021,531 A | * | 2/2000 | Kirko | 4/144.3 |
| D464,729 S | | 10/2002 | Rehrig | |
| D467,338 S | | 12/2002 | Rehrig | |
| 6,684,414 B1 | | 2/2004 | Rehrig | |
| 6,857,137 B2 | | 2/2005 | Otto | |
| 6,904,621 B2 | | 6/2005 | Otto et al. | |
| 2003/0140409 A1 | * | 7/2003 | Johnson | 4/458 |

* cited by examiner

*Primary Examiner* — Basil Katcheves
*Assistant Examiner* — Beth Stephan
(74) *Attorney, Agent, or Firm* — Montgomery Patent & Design, LLC; Robert C. Montgomery; Joseph T. Yaksich

(57) ABSTRACT

A mobile sanitary urinal apparatus for truck drivers or others who do not have access to restroom facilities while traveling comprising a removable accumulation vessel mounted to interior or exterior of a motor vehicle is herein disclosed. The urinal is designed to be discretely used in the passenger compartment of tractor-trailer rigs, although it can be used discretely in almost any vehicle. It comprises a catheter-type receiver which attaches to plumbing thereby functioning as a urinal to receive urine from a user and directing it through the hose to a retention container. It is envisioned that the retention container would be emptied into a sanitary collection station or normal restroom when feasible. The urinal can be cleaned periodically using a provided sanitation kit with a flushing bulb and liquid cleanser that would be flushed through the system cleaning the valves, hoses, and container.

15 Claims, 6 Drawing Sheets

MOBILE SANITARY URINAL AND METHOD OF USE THEREOF

RELATED APPLICATIONS

The present invention was first described in and claims the benefit of U.S. Provisional Patent No. 60/937,472 filed on Jun. 29, 2007, the entire disclosures of which are incorporated herein by reference.

FIELD OF THE INVENTION

The present invention relates generally to a urinal and, more particularly, to a mobile sanitary urinal for enabling OTR (over-the-road) drivers to relieve themselves in the comfort and convenience of a portable device, said mobile sanitary urinal capable of holding an amount of liquid therein for subsequent removal and further comprising a sanitation kit for cleansing said mobile sanitary urinal.

BACKGROUND OF THE INVENTION

The number and frequency of public restrooms in our country are reducing every day for a variety of reasons. This fact poses a special problem for those who make their living on the road such as long haul truck drivers. Without restrooms in place, they perform their bodily functions on the sides of roads or in empty containers that end up discarded on the roadside, neither of which is sanitary or acceptable solution. The lack of public restrooms poses a problem particularly for those suffering from incontinence, weak bladders or frequent urination. Finally, those taking long car trips with male children are faced with the same problems. Accordingly, there exists a need for a means by which those who do not have easy access to public restrooms can be afforded a solution that allows them to urinate. The development of the invention herein described provides this solution.

U.S. Pat. No. D 467,338 issued to Rehrig discloses an ornamental design for a portable urinal. This patent does not appear to disclose a mobile sanitary urinal that possesses a sanitation pack, a fluid vessel with internal baffles and a handle, plumbing components including a float valve and an in-line valve nor does the cited patent appear to be similar in appearance to the instant invention.

U.S. Pat. No. D 464,729 issued to Rehrig disclose an ornamental design for a portable urinal. This patent does not appear to disclose a mobile sanitary urinal that possesses a sanitation pack, a fluid vessel with internal baffles and a handle, plumbing components including a float valve and an in-line valve, and a mounting bracket nor does the cited patent appear to be similar in appearance to the instant invention.

U.S. Pat. No. D 354,122 issued to Carlier discloses an ornamental design for a mobile urinal unit. This patent does not appear to disclose a mobile sanitary urinal with a fluid vessel, plumbing components and a mounting bracket nor does the cited patent appear to be similar in appearance to the instant invention.

U.S. Pat. No. 6,904,621 issued to Otto and Otto discloses a urine collection device to receive urine from a user for transport via plumbing to a reservoir. This patent does not appear to disclose a mobile sanitary urinal that possesses a sanitation pack, a fluid vessel with internal baffles and a handle, plumbing components including a float valve and an in-line valve and a mounting bracket.

U.S. Pat. No. 6,857,137 issued to Otto and Otto discloses a urine collection device that is mountable on a wheeled pole. This patent does not appear to disclose a mobile sanitary urinal that possesses a sanitation pack, a fluid vessel with internal baffles and a handle, plumbing components including a float valve and an in-line valve and a mounting bracket for mounting the apparatus to a vehicle.

U.S. Pat. No. 6,684,414 issued to Rehrig discloses a portable urinal that appears to be a receiver connected to a reservoir bag. This patent does not appear to disclose a mobile sanitary urinal that possesses a sanitation pack, a fluid vessel with internal baffles and a handle, plumbing components including a float valve and an in-line valve and a mounting bracket for vehicles.

U.S. Pat. No. 6,021,531 issued to Kirko discloses a portable unisex urinal that appears to be funnel shaped receiver attached to a container. This patent does not appear to disclose a mobile sanitary urinal that possesses a sanitation pack, a fluid vessel with internal baffles and a handle, plumbing components including a float valve and an in-line valve and a mounting bracket for vehicles.

U.S. Pat. No. 5,894,608 issued to Birbara discloses a portable system for the collection of urine that uses fans and suction in the collection of urine from a user. This patent does not appear to disclose a non-mechanized method of collecting urine from a user in a motor vehicle nor does the patent appear to disclose a fluid vessel with baffles and a handle or the plumbing configuration of the instant invention.

U.S. Pat. No. 5,848,443 issued to Waugh discloses a portable automobile urinal which appears to be an elevated container with flushing solution, a bowl and a receptacle container. This patent does not appear to disclose an apparatus that does not require an elevated container nor does it appear to disclose a mobile sanitary urinal that possesses a sanitation pack, a fluid vessel with internal baffles and a handle, plumbing components including a float valve and an in-line valve and a mounting bracket for vehicles.

U.S. Pat. No. 5,655,229 issued to Horn discloses a portable urinal device for bedside and travel use that appears to be a receiver and a container. This patent does not appear to disclose a mobile sanitary urinal that possesses a sanitation pack, a fluid vessel with internal baffles and a handle, plumbing components including a float valve and an in-line valve and a mounting bracket for vehicles.

U.S. Pat. No. 5,551,097 issued to Short appears to disclose a mechanized compact urinal system. This patent does not appear to disclose a non-mechanized method of collecting urine from a user in a motor vehicle nor does the patent appear to disclose a fluid vessel with baffles and a handle, the plumbing configuration of the instant invention and a sanitation pack.

SUMMARY OF THE INVENTION

In view of the foregoing disadvantages inherent in the prior art, it has been observed that there is a need for a mobile sanitary urinal.

It is an object of the present invention to describe an apparatus and a method for a mobile sanitary urinal which provides a sanitary and convenient means for motor vehicle operators or other users to urinate who do not have access to restroom facilities while traveling. The apparatus will provide a means for convenient urination for a wide variety of applications such as, but not limited to, long-haul truck drivers, small-craft airplane pilots, racecar drivers, and normal motorists.

Another object of the mobile sanitary urinal is to provide removable attachable utilization of the mobile sanitary urinal to the interior or exterior of a vehicle.

A further object of the mobile sanitary urinal is to provide a means to transport urine from a user to a fluid vessel located a distance away from the user.

Yet another object of the mobile sanitary urinal is a mounting bracket conformable to many different makes, models and types of vehicles.

Yet a further object of the mobile sanitary urinal possesses a sanitation pack that provides the user a packaged cleaning and sanitizing means using established antiseptic methods.

An aspect of the mobile sanitary urinal comprises: a catheter-type receiver, a valve, plumbing components, a fluid vessel, a mounting bracket and a sanitation pack. The catheter-type receiver comprises a standard commercially available catheter device made of flexible latex providing an expected receiving orifice such that it conforms thereto a penis of the user.

Another aspect of the mobile sanitary urinal comprises plumbing components further comprising a valve, a first hose, a second hose and a hose connector cap. The catheter-type receiver comprises a nipple providing normal friction attachment to the second hose. The second hose is envisioned to be a commercially available hospital-grade product made of flexible and chemical resistant latex, or equivalent material. The second hose provides a fluid control means via an in-line valve located in close proximity to the receiver. The valve comprises an in-line installation between the second and first hoses. The valve allows one-handed operation by the user and is envisioned to be made of materials such as plastic, stainless steel, or the like. The second and first hoses in-turn provide a fluid communication means to a flow of urine/liquid waste from said receiver to a removably attachable hose connector cap located upon the fluid vessel. The first vent cap and internal float valve, provide both a ventilation means and a containment means thereby preventing accidental spilling of urine/liquid waste due to violent motion or due to urine/liquid waste exceeding a capacity of the fluid vessel.

A further aspect of the mobile sanitary urinal comprises a hose connector cap that further comprises a tethered vessel cap to be utilized during removal of the first hose and a threaded hose connector providing removable attachment to the fluid vessel along an upper surface. The fluid vessel provides an internal volume of approximately one (1) to three (3) quarts being sufficient to sustain several uses of the apparatus by a user during an extended period of travel. The fluid vessel is envisioned to be made of a transparent or translucent chemically resistant plastic such as polyethylene, polypropylene, or the like. The fluid vessel is further envisioned to be provided in a variety of shapes and sizes to allow for various mounting configurations on a vehicle. The fluid vessel further comprises a pair of handles, a plurality of internal baffles, a first vent cap, and a fluid level indicator. The handles provide easy manipulation of the apparatus via opposing molded depressions located along side surfaces of the fluid vessel. The fluid level indicator comprises a plurality of molded-in protruding graduated lines along one (1) or more side surfaces of the fluid vessel providing a user a quick visual indication of an amount of fluid contents collected therein. The first vent cap and internal float valve provide both a ventilation means and a containment means thereby preventing accidental spilling of urine/liquid waste due to violent motion or due to urine/liquid waste exceeding a capacity of the fluid vessel.

Yet another aspect of the mobile sanitary urinal comprises baffles which are a plurality of internal parallel vertical panels which extend between opposing side wall portions of the fluid vessel being suspended approximately two (2) inches above a floor portion of the fluid vessel. Said baffles provide effective arresting of excessive fluid movement within the fluid vessel during rough travel.

Still another aspect of the mobile sanitary urinal comprises a mounting bracket that provides secure removable attachment of the fluid vessel to the vehicle either internally or externally. The mounting bracket comprises a "U"-shaped sheet metal structure including particular features to clamp and captivate the fluid vessel in a stationary manner. The mounting bracket comprises an upper horizontal member, a lower horizontal member, and a connecting vertical rear member. The upper member holds the fluid vessel in a stationary manner against the opposing parallel lower member portion of the mounting bracket. The upper member further comprises an appropriately sized and shaped clearance slot at an intermediate position to permit the hose connector cap portion to protrude upwardly and slide out of the mounting bracket during removal of the fluid vessel. The lower member further comprises a pair of retaining curbs along outer edges of the lower member portion providing additional lateral stability to the fluid vessel. The mounting bracket provides an additional holding means via a plurality of hook-and-loop strips located along inner surfaces of the vertical rear member of the mounting bracket and located in corresponding positions upon the fluid vessel. The mounting bracket further comprises a plurality of equally-spaced mounting apertures providing a mounting means to the vehicle structure, along a variety of interior and exterior locations.

Yet a further aspect of the mobile sanitary urinal is a sanitary pack further comprising a common cardboard box-like package with a plurality of receivers in packaging, a plurality of moist-wipes, a flushing bulb, and a container with liquid disinfectant. The wipes provide a normal sanitation means to the user's person as well as the components of the apparatus. The wipes are common commercially available packaged moist-wipes. The flushing bulb comprises a spherically-shaped flexible rubber bulb providing a means to manually flush all internal and external surfaces of the mobile sanitary urinal as needed using a common liquid disinfectant. During disinfecting, the liquid disinfectant is introduced directly into the receiver or second hose portion passing through and disinfecting the entire fluid path and fluid vessel.

Another aspect of the mobile sanitary urinal is the hose connector cap portion that provides sealed removable attachment of the first hose to the fluid vessel. The hose connector cap comprises a captured first tether strap, a vessel cap, a threaded hose connector, and a flange. The hose connector and hose connector cap provide sealing and attaching features and functions similar to fittings used on common portable plastic gasoline containers. The first hose comprises an integral flange along a bottom edge region. The vessel cap provides a closure means to the fluid vessel during temporary or permanent removal of the first hose.

Still another aspect of the mobile sanitary urinal is a vent connector portion comprising a vent connector, a second tether strap, a first vent cap, a float valve, and a float. The float valve provides containment of the liquid waste during periods of rough travel or in such cases as the internal volume of the fluid vessel is exceeded. In such instances, a float valve is lifted due to buoyancy, blocking a flow of urine/liquid waste from the fluid vessel. The first vent cap comprises a cylindrical closure device having an integral circular vented region along a top surface. The first vent cap is attached thereto the vent connector and may be easily removed for cleaning.

Yet still another aspect of the mobile sanitary urinal is a valve that provides manual control of contained urine/liquid waste to prevent leakage and to provide containment of odors from the mobile sanitary urinal. The valve comprises a common shuttle-spool type valve with a pair of push-pull knobs arranged in-line between the first and second hoses by integral barbed male connectors molded into a housing portion of the valve.

An aspect of the mobile sanitary urinal, in an alternate embodiment comprises an alternate ventilation configuration with an alternate remote flange-mounted comprising a third hose and a mountable flange in lieu of the previously described float valve. Upon installation to a vehicle, the third hose and mountable flange provide effective redirection and removal of offensive odors emitted from the apparatus. The third hose is removably attached to the fluid vessel by a second vent cap. During emptying of the apparatus, the second vent cap enables a user to easily remove the third hose and remove the fluid vessel from the mounting bracket. The third hose extends a variable distance from the second vent cap subsequently passing down through the flange envisioned to be permanently mounted above a pre-drilled hose aperture in an external panel of the vehicle. The flange comprises a disc-shaped plastic or stainless steel plate having a centrally located circular aperture and is affixed to, for example, a vehicle floor. The flange further provides an aesthetic appearance and a flush mounting means to interior portions of the vehicle.

A method for installing and utilizing the mobile sanitary urinal may be achieved by performing the following steps: locating a secure and convenient location for the apparatus along interior or exterior portions of the vehicle; installing the mounting bracket thereto the vehicle using the mounting apertures and provided fastener assemblies; inserting the fluid vessel therein the mounting bracket; securing said fluid vessel to the mounting bracket using the hook-and-loop strips; threadingly attaching the first hose and hose connector cap to the hose connector; routing the first hose to a convenient location within the vehicle; attaching the valve and receiver portion to the second hose; utilizing the apparatus as needed by opening the valve; relieving oneself by directing urine/liquid waste into the receiver, through the second hose, and subsequently into the fluid vessel; closing the valve once the flow of urine is stopped; obtaining the sanitation pack; cleaning oneself and the apparatus as required, using the wipes; emptying the fluid vessel after several usages in a restroom or other appropriate waste dumping facility; periodically disinfecting the apparatus; charging the flushing bulb with liquid disinfectant; opening the valve; inserting the flushing bulb into the receiver and/or second hose; flushing all interior portions of the apparatus thoroughly with said liquid disinfectant; cleaning exterior surfaces of the apparatus as required using the wipes and/or the liquid disinfectant; and, benefiting from a convenient and sanitary means to urinate during travel using the present invention.

A method of installing and utilizing the alternate ventilation configuration may be achieved by performing the following additional steps: inserting the third hose into the second vent cap; threadingly attaching the second vent cap to the fluid vessel; pre-drilling a hose aperture at a desired location therein the vehicle with which to insert the third hose; mounting the flange thereto the vehicle being centered thereupon the pre-drilled hose aperture using the provided fastener assemblies; routing the third hose from the fluid vessel thereto the flange; inserting an end portion of the third hose therein the flange; utilizing the apparatus for urination as described above; and; benefiting from reduced odors emitted from the apparatus using the alternate vent arrangement.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
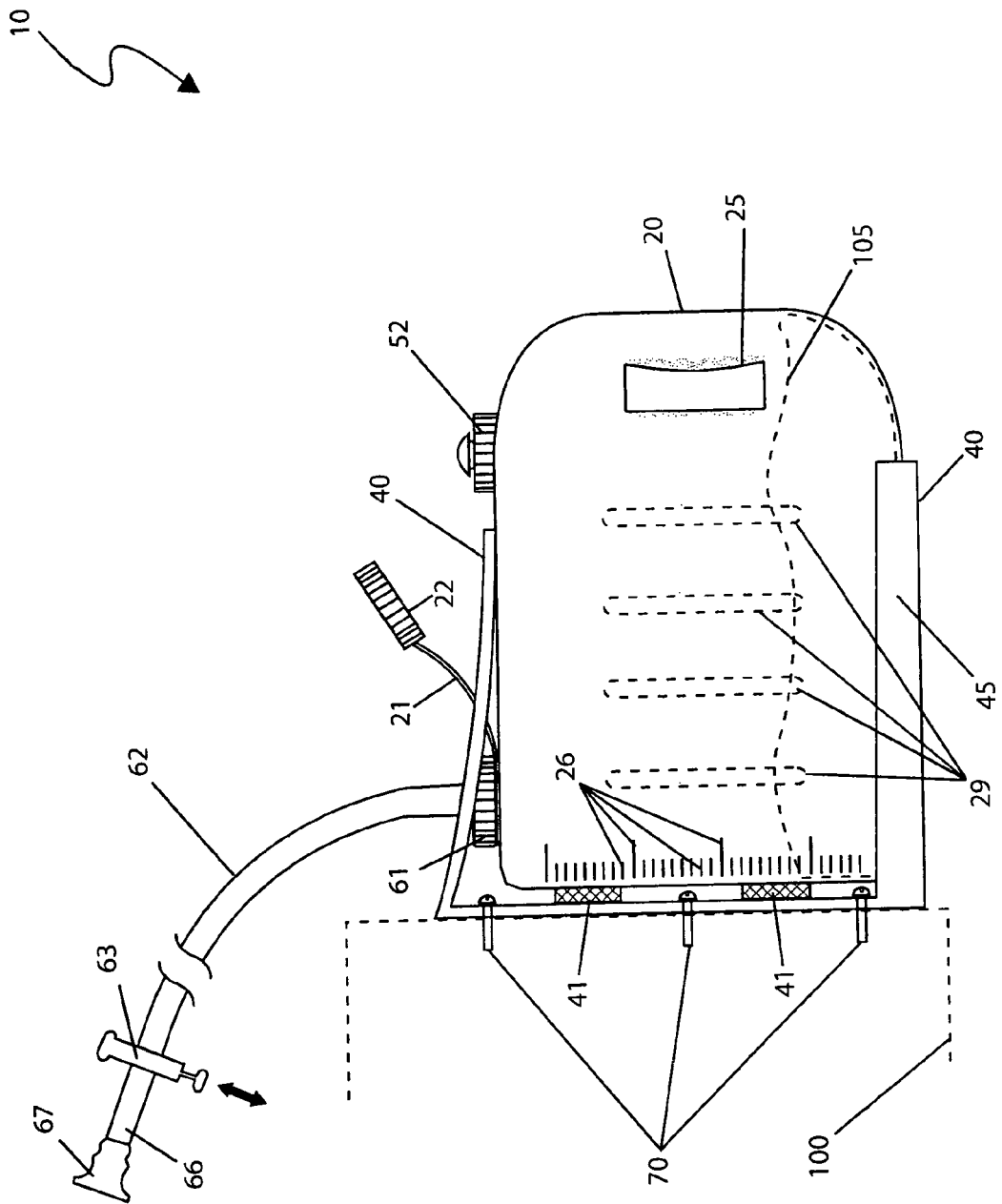
FIG. 1 is a side view of the mobile sanitary urinal and method of use thereof 10, according to a preferred embodiment of the present invention.

DESCRIPTIVE KEY 10 mobile sanitary urinal
20 fluid vessel
21 first tether strap
22 vessel cap
25 handle
26 level indicator
29 baffle
30 sanitation pack
31 plurality of wipes
32 flushing bulb
33 liquid disinfectant
34 receiver packaging
35 hose connector
36 package
37 liquid disinfectant container
40 mounting bracket
41 hook-and-loop strips
42 upper member
43 clearance slot
44 lower member
45 retaining curb
46 rear member
47 mounting apertures
50 vent connector
51 second tether strap
52 first vent cap
54 float valve
55 float
60 hose connector
61 hose connector cap
62 first hose
63 valve
64 knob
65 barbed fitting
66 second hose
67 receiver 68 flange
70 fastening assembly
80 second vent cap
81 third hose
82 mounting flange
83 third tether strap
100 vehicle
105 urine/liquid waste
110 pre-drilled aperture

DETAILED DESCRIPTION OF THE PREFERRED EMBODIMENT

Figure 4:
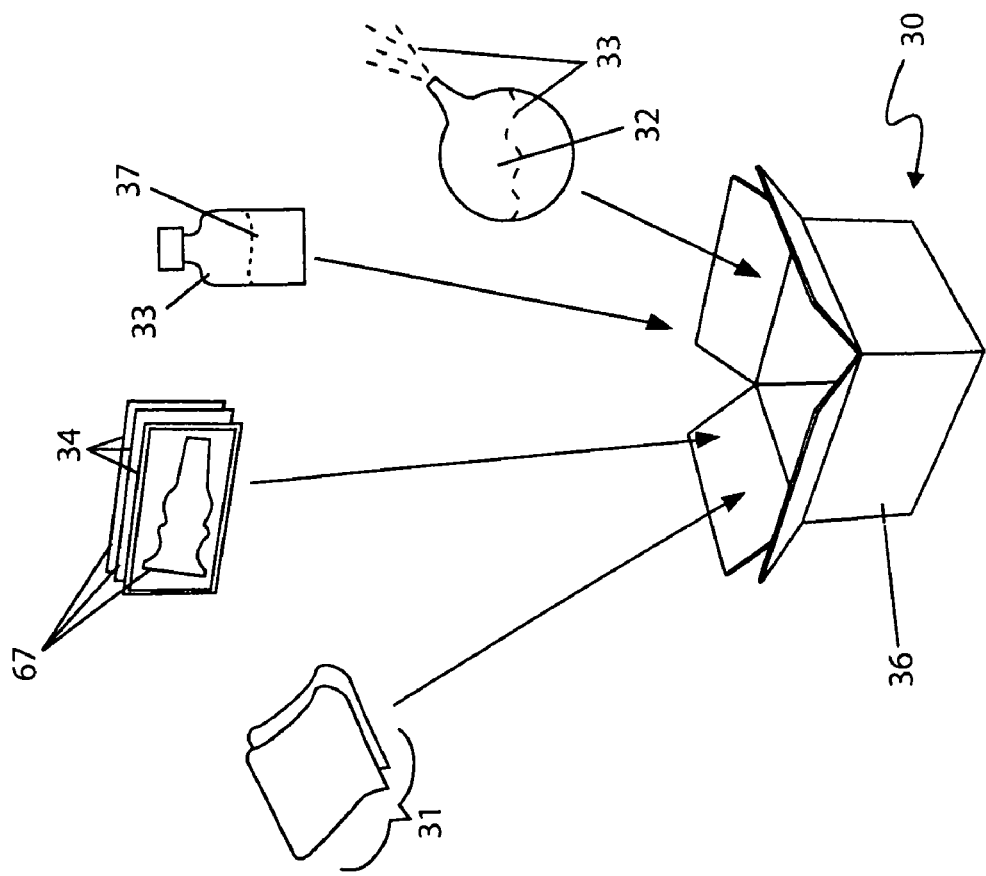
FIG. 4 is an exploded view of the sanitary pack 30 portion of the mobile sanitary urinal and method of use thereof 10, according to a preferred embodiment of the present invention.
Figure 5A:
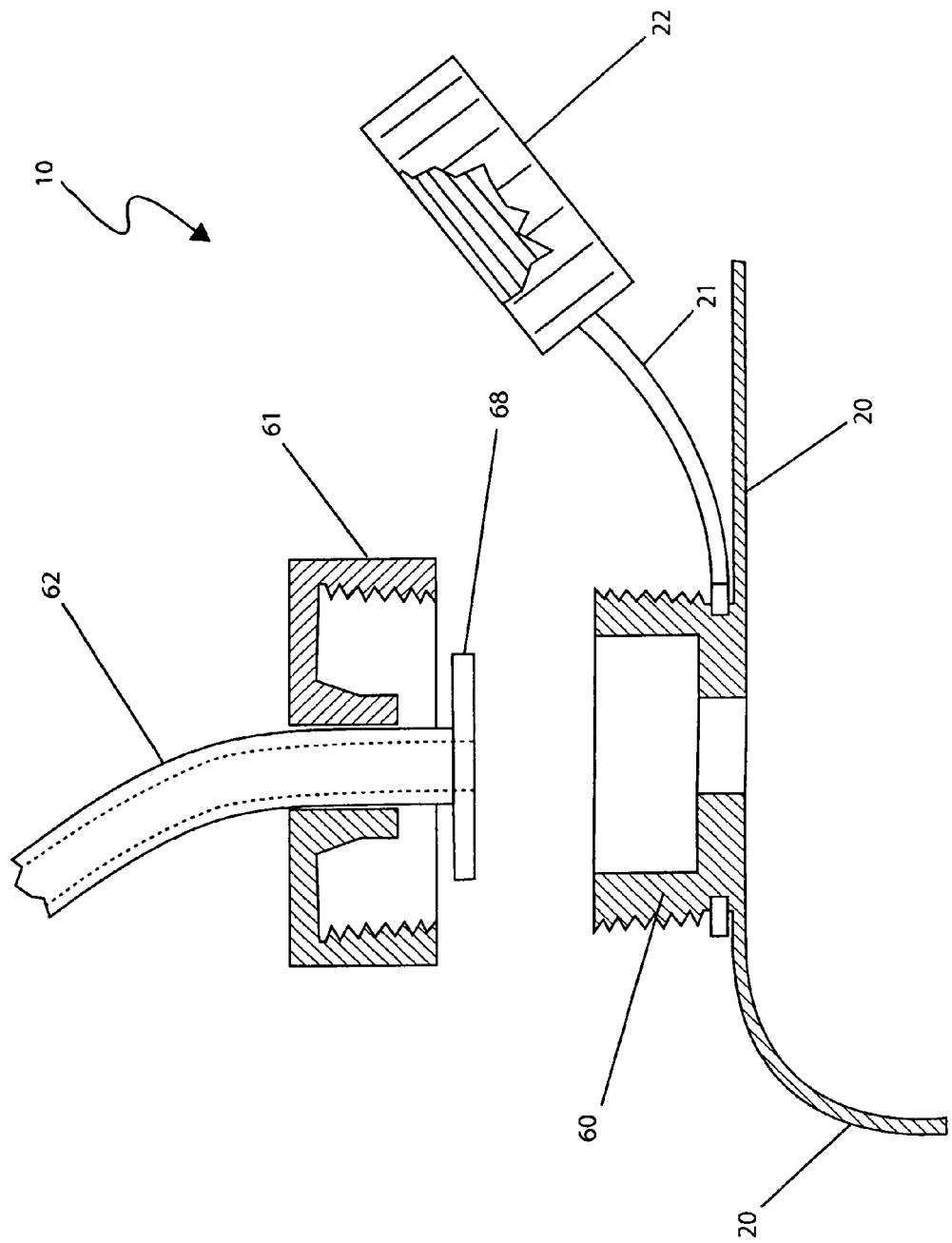
FIG. 5a is a close-up view of a hose connector cap portion 61, according to the preferred embodiment of the present invention.
Figure 5C:
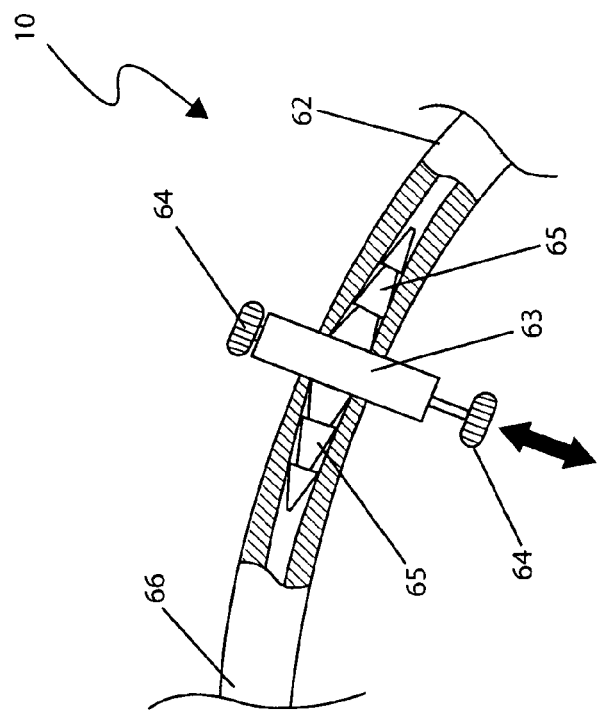
FIG. 5c is a close-up view of a valve portion 63, according to the preferred embodiment of the present invention; and, FIG. 6 is a side view of the mobile sanitary urinal and method of use thereof 10 depicting an alternate ventilation configuration, according to an alternate embodiment of the present invention.
Figure 5B:
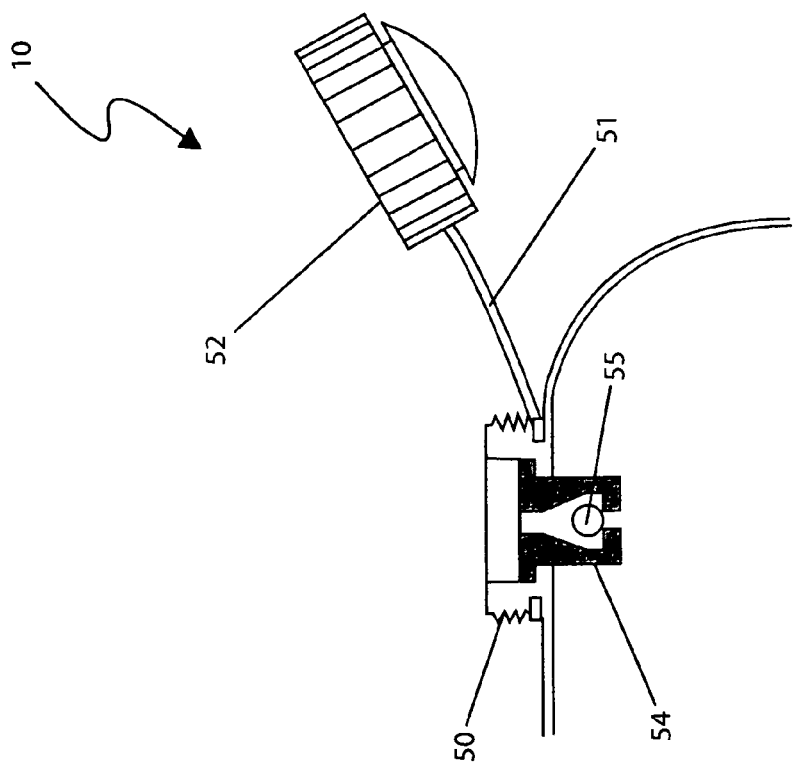
FIG. 5b is a close-up view of a vent connector portion 50, according to the preferred embodiment of the present invention.
Figure 6:
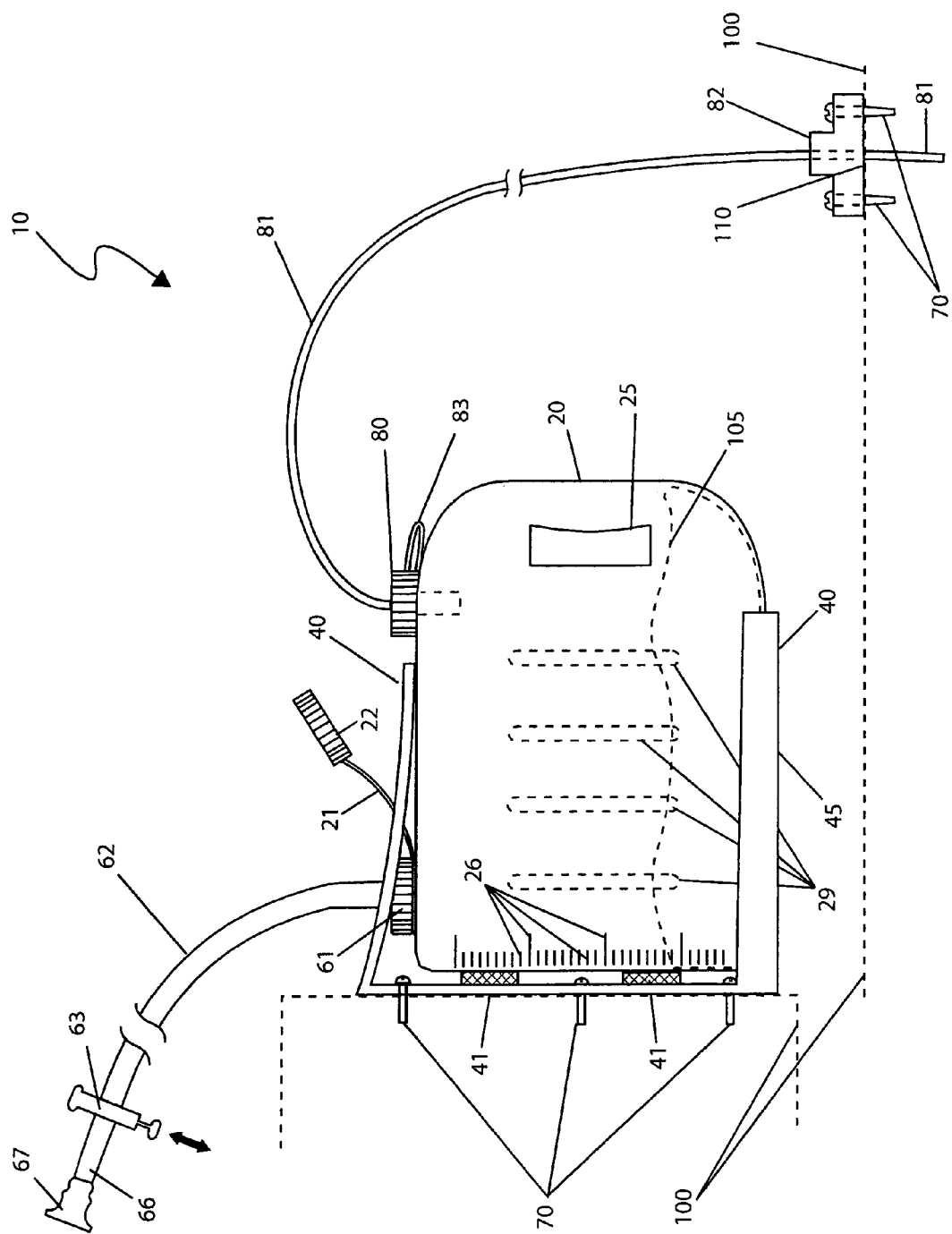

The best mode for carrying out the invention is presented in terms of its preferred embodiment, herein depicted within FIGS. 1 through 5c and in terms of an alternate embodiment as depicted within FIG. 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a mobile sanitary urinal (herein described as the "apparatus") 10, which provides a sanitary and convenient means for motor vehicle operators or other users to urinate who do not have access to restroom facilities while traveling. The apparatus 10 comprises a catheter-type receiver 67, fluid plumbing, a fluid vessel 20, and a sanitation pack 30. The apparatus 10 is envisioned to provide a means for convenient urination for a wide variety of applications such as, but not limited to, long-haul truck drivers, small-craft airplane pilots, racecar drivers, and normal motorists.

Referring now to FIG. 1, a side view of the apparatus 10, according to the preferred embodiment of the present invention, is disclosed. The apparatus 10 comprises a receiver 67, a valve 63, a first hose 62, a second hose 66, a fluid vessel 20, and a mounting bracket 40. The apparatus 10 provides mobile and removably attachable utilization of a fluid vessel 20 and associated plumbing thereto interior or exterior vehicle structures 100. The apparatus 10 provides particular fluid plumbing components to transport urine 105 therefrom a user thereto the fluid vessel 20 being located at some distance therefrom. Said plumbing components include a receiver 67, a valve 63, a first hose 62, a second hose 66, and a hose connector cap 61. The receiver 67 comprises a standard commercially available catheter device made of flexible latex providing an expected receiving orifice such that it conforms thereto a penis of the user. The receiver 67 comprises a nipple providing normal friction attachment thereto the second hose 66. The second hose 66 is envisioned to be a commercially available hospital-grade product made of flexible and chemical resistant latex, or equivalent material. The second hose 66 provides a fluid control means via an in-line valve 63 being located in close proximity thereto the receiver 67. The valve 63 comprises an in-line installation therebetween the second 66 and first 62 hoses. The valve 63 allows one-handed operation by the user and is envisioned to be made of materials such as plastic, stainless steel, or the like. The second 66 and first 62 hoses in-turn provides a fluid communication means thereto a flow of urine/liquid waste 105 therefrom said receiver 67 thereto a removably attachable hose connector cap 61 (see FIG. 2).

Figure 2:
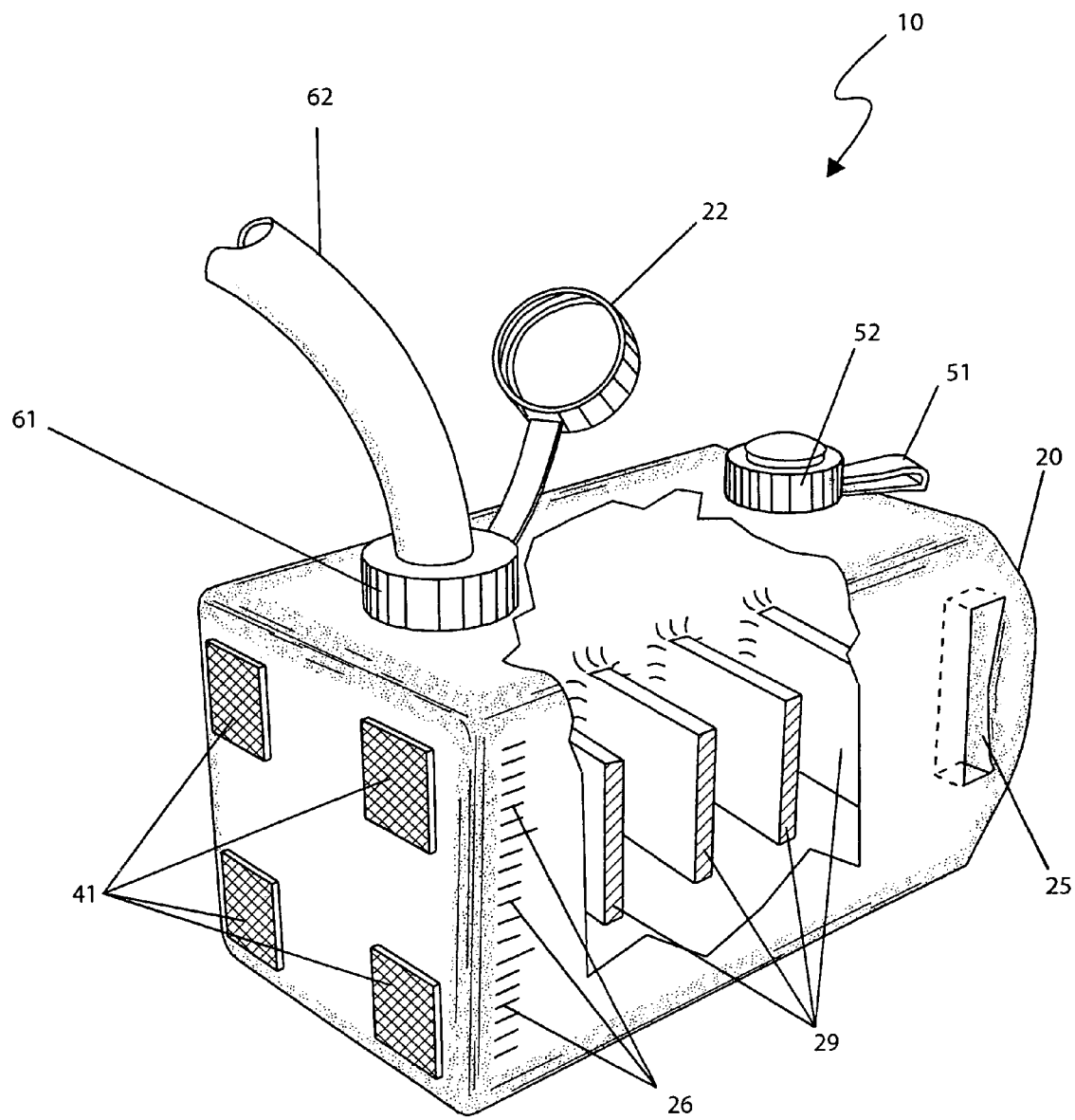
FIG. 2 is a perspective view of a fluid vessel portion 20 of the mobile sanitary urinal and method of use thereof 10, according to a preferred embodiment of the present invention.

Referring now to FIG. 2, a perspective view of a fluid vessel portion 20 of the mobile sanitary urinal and method of use thereof 10, according to a preferred embodiment of the present invention, is disclosed. The hose connector cap 61 provides connection of the first hose 62 thereto the fluid vessel 20 further comprising a tethered vessel cap 22 to be utilized during removal of the first hose 62 therefrom, and a threaded hose connector 60 providing removable attachment thereto the fluid vessel 20 along an upper surface thereof (see FIG. 5a). The fluid vessel 20 provides an internal volume of approximately one (1) to three (3) quarts being sufficient to sustain several uses of the apparatus 10 by a user during an extended period of travel. The fluid vessel 20 is envisioned to be made of a transparent or translucent chemically resistant plastic such as polyethylene, polypropylene, or the like. The fluid vessel 20 is further envisioned to be provided in a variety of shapes and sizes to allow for various mounting configurations on a vehicle 100. The fluid vessel 20 further comprises several enhancements including a pair of handles 25, a plurality of internal baffles 29, a first vent cap 52, and a fluid level indicator 26. The handles 25 provide easy manipulation of the apparatus 10 via opposing molded depressions located along side surfaces of the fluid vessel 20. The first vent cap 52 and internal float valve 54 (see FIG. 5b), provide both a ventilation means and a containment means thereby preventing accidental spilling of urine/liquid waste 105 due to violent motion or due to urine/liquid waste 105 exceeding a capacity of the fluid vessel 20. The baffles 29 comprise a plurality of internal parallel vertical panels which extend between opposing side wall portions of the fluid vessel 20 being suspended approximately two (2) inches above a floor portion of the fluid vessel 20. Said baffles 29 provide effective arresting of excessive fluid movement therewithin the fluid vessel 20 during rough travel. The fluid level indicator 26 comprises a plurality of molded-in protruding graduated lines along one (1) or more side surfaces of the fluid vessel 20 providing a user a quick visual indication of an amount of fluid contents collected therein. The mounting bracket 40 provides secure removable attachment of the fluid vessel 20 thereto the vehicle 100 being affixed thereto internal or external surfaces thereof (see FIG. 3).

Figure 3:
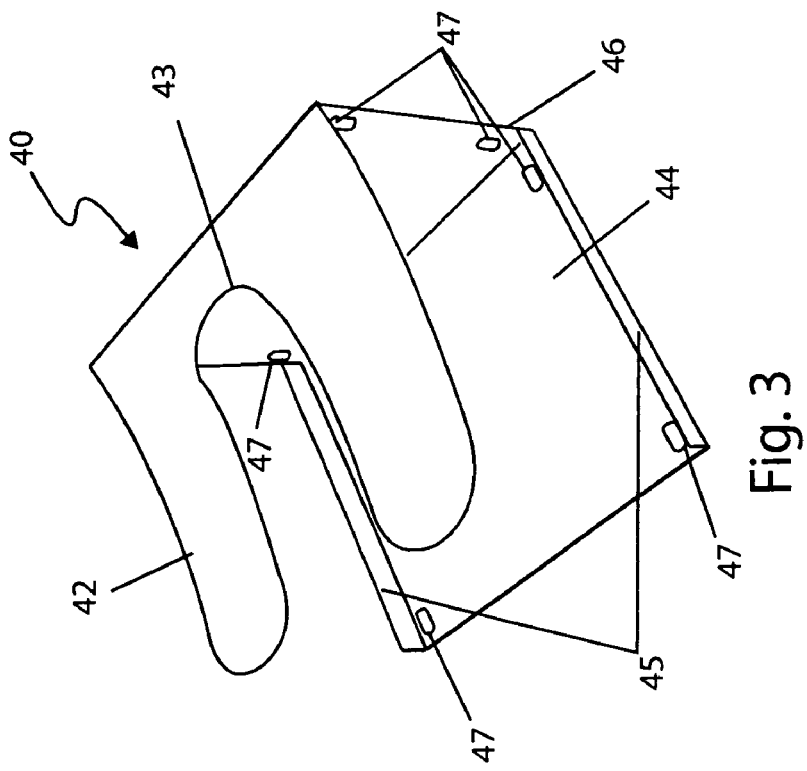
FIG. 3 is a side perspective view of the remote mounting bracket portion 40 of the mobile sanitary urinal and method of use thereof 10, according to an alternative embodiment of the present invention.

Referring now to FIG. 3, a side perspective view of the remote mounting bracket portion 40 of the apparatus 10, according to the preferred embodiment of the present invention, is disclosed. The mounting bracket 40 comprises a "U"-shaped sheet metal structure including particular features to clamp and captivate the fluid vessel 20 in a stationary manner. The mounting bracket 40 comprises an upper horizontal member 42, a lower horizontal member 44, and a connecting vertical rear member 46. The mounting bracket 40 comprises a single-piece formed metal shape envisioned to be made using tempered corrosion-resistant metal such as stainless steel, plated carbon steel, or the like being fabricated using common industrial processes such as stamping, cutting, bending, welding, and the like. The upper member 42 extends over and against a top surface of the fluid vessel 20, thereby exerting a downward clamping force upon said fluid vessel 20 to hold it in a stationary manner thereagainst the opposing parallel lower member portion 44 of the mounting bracket 40. The upper member 42 further comprises an appropriately sized and shaped clearance slot 43 at an intermediate position so as to allow the aforementioned hose connector cap portion 61 to protrude upwardly and slide out of the mounting bracket 40 during removal of said fluid vessel 20 therefrom. The lower member 44 further comprises a pair of retaining curbs 45 being approximately one (1) inch high and formed at right angles along outer edges of the lower member portion 44, thereby providing additional lateral stability thereto the fluid vessel 20 when inserted therein. The mounting bracket 40 provides an additional holding means via a plurality of hook-and-loop strips 41 being located along inner surfaces of the vertical rear member 46 of the mounting bracket 40 and also located in corresponding positions upon the fluid vessel 20. Said hook-and-loop strips 41 are envisioned being affixed thereto mating surfaces using a common adhesive backing. During insertion of the fluid vessel 20 therein the mounting bracket 40, contact therebetween opposing hook-and-loop strips 41 provides expected holding adhesion therebetween. The mounting bracket 40 further comprises a plurality of equally-spaced mounting apertures 47 providing a mounting means thereto the vehicle structure 100 using a plurality of common corrosion-resistant fastening assemblies 70, along a variety of interior and exterior locations based upon particular vehicle features 100 as well as a user's preference. The mounting bracket 40 is envisioned to be provided in a variety of sizes and configurations for mounting the apparatus 10 in various internal and external locations on various makes and model vehicles 100.

Referring now to FIG. 4, an exploded view of the sanitary pack 30 portion of the apparatus 10, according to the preferred embodiment of the present invention, is disclosed. The sanitation pack 30 provides a user a packaged cleaning and sanitizing means allowing application thereto oneself as well as the apparatus 10 using established antiseptic methods and commonly available materials. The sanitation pack 30 comprises a common cardboard box-like package 36 comprising a plurality of receivers 67 therein packaging 34, a plurality of moist-wipes 31, a flushing bulb 32, and a container 37 comprising liquid disinfectant 33. The wipes 31 provide a normal sanitation means to the user's person as well as the components of the apparatus 10, as required. The wipes 31 are envisioned to be common commercially available packaged moist-wipes being readily available in a market. The flushing bulb 32 comprises a spherically-shaped flexible rubber bulb providing a means to manually flush all internal and external surfaces of the apparatus 10 as needed using a common liquid disinfectant 33 dispensed therein from said container 37. During disinfecting, the liquid disinfectant 33 is introduced directly into the receiver 67 or second hose portion 62 of the apparatus 10 subsequently passing therethrough and disinfecting the entire fluid path and fluid vessel 20.

Referring now to FIG. 5a, a close-up view of a hose connector cap portion 61, according to the preferred embodiment of the present invention, is disclosed. The hose connector cap 61 provides sealed removable attachment of the first hose 62 thereto the fluid vessel 20. The hose connector cap 61 comprises a captured first tether strap 21, a vessel cap 22, a threaded hose connector 60, and a flange 68. The hose connector 60 and hose connector cap 61 provide sealing and attaching features and functions similar to fittings used on common portable plastic gasoline containers. The first hose 62 comprises an integral flange 68 along a bottom edge region. In use, the flange 68 is compressed therebetween the hose connector cap 61 and the hose connector 60 to seal in urine/liquid waste 105. The vessel cap 22 provides a closure means thereto the fluid vessel 20 during temporary or permanent removal of the first hose 62 therefrom the apparatus 10.

Referring now to FIG. 5b, a close-up view of a vent connector portion 50, according to the preferred embodiment of the present invention, is disclosed. The apparatus 10 comprises a vent connector 50, a second tether strap 51, a first vent cap 52, a float valve 54, and a float 55. The vent valve 54 provides containment of the urine/liquid waste 105 during periods of rough travel or in such cases as the internal volume of the fluid vessel 20 is exceeded. In such instances, a float valve 54 is lifted due to buoyancy, thereby sealing against an internal seat to block a flow of urine/liquid waste 105 therefrom the fluid vessel 20. During use, the tethered first vent 52 is normally installed thereupon the vent connector 50; however, said first vent cap 52 is illustrated here being detached for illustration purposes. The first vent cap 52 comprises a cylindrical closure device having an integral circular vented region along a top surface. The first vent cap 52 is threadingly attached thereto the vent connector 50 and may be easily removed for cleaning.

Referring now to FIG. 5c, a close-up view of the valve 63, according to the preferred embodiment of the present invention, is disclosed. The valve 63 provides manual control of contained urine/liquid waste 105 to prevent leakage as well as providing containment of fumes and odors therefrom the apparatus 10. The valve 63 comprises a common shuttle-spool type valve comprising a pair of push-pull knobs 64 and being arranged in an in-line fashion therebetween the first 62 and second 66 hoses via integral barbed male connectors 65 molded thereinto a housing portion of the valve 63.

Referring now to FIG. 6, a side view of the mobile sanitary urinal for male truck drivers 10 depicting an alternate ventilation configuration, according to an alternate embodiment of the present invention, is disclosed. The apparatus 10 is illustrated here utilizing an alternate remote flange-mounted embodiment comprising a third hose 81 and a mountable flange 82 in lieu of the previously described float valve 54. When installed therein a vehicle 100, the third hose 81 and mountable flange 82 provide effective redirection and removal of offensive odors emitted therefrom the apparatus 10. The third hose 81 is removably attached thereto the fluid vessel 20 via a second vent cap 80. The second vent cap 80 is envisioned to be similar thereto the aforementioned hose connector cap 61 by providing similar hose sealing functions. During emptying of the apparatus 10, the second vent cap 80 enables a user to easily remove the third hose 81 and remove the fluid vessel 20 therefrom the mounting bracket 40. The third hose 81 comprises similar materials as the first hose 62 and extends a variable distance therefrom the second vent cap 80 subsequently passing down through the flange 82 envisioned to be permanently mounted above a pre-drilled hose aperture 110 therein an external panel of the vehicle 100 using a pair of fastening assemblies 70. The flange 82 comprises a disc-shaped plastic or stainless steel plate having a centrally located circular aperture which provides a sliding fit thereto the third hose 81 and is affixed thereto, for example, a vehicle floor 100 using said fastening assemblies 70. The flange 82 provides an aesthetic appearance and a flush mounting means thereto interior portions of the vehicle 100.

Alternately the apparatus 10 may be utilized to collect liquid waste other than urine 34 for subsequent removal.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: locating a secure and convenient location for the apparatus 10 along interior or exterior portions of the vehicle 100; installing the mounting bracket 40 thereto the vehicle 100 using the mounting apertures 47 and provided fastener assemblies 70; inserting the fluid vessel 20 therein the mounting bracket 40; securing said fluid vessel 20 thereto the mounting bracket 40 using the hook-and-loop strips 41; threadingly attaching the first hose 62 and hose connector cap 61 thereto the hose connector 60; routing the second hose 66 thereto a convenient location therewithin the vehicle 100; attaching the valve 63 and receiver portion 67 thereto the second hose 66; utilizing the apparatus 10 as needed by opening the valve 63; relieving oneself by directing urine/liquid waste 105 thereinto the receiver 67, through the second hose 66, and subsequently into the fluid vessel 20; closing the valve 63 once the flow of urine 105 is stopped; obtaining the sanitation pack 30; cleaning oneself and the apparatus 10 as required, using the wipes 31; emptying the fluid vessel 20 after several usages in a restroom or other appropriate waste dumping facility; periodically disinfecting the apparatus 10; charging the flushing bulb 32 with liquid disinfectant 33; opening the valve 63; inserting the flushing bulb 32 thereinto the receiver 67 and/or second hose 66; flushing all interior portions of the apparatus 10 thoroughly with said liquid disinfectant 33; cleaning exterior surfaces of the apparatus 10 as required using the wipes 31 and/or the liquid disinfectant 33; and, benefiting from a convenient and sanitary means to urinate during travel using the present invention 10.

The method of installing and utilizing the alternate ventilation configuration may be achieved by performing the following additional steps: inserting the third hose 81 thereinto the second vent cap 80; threadingly attaching the second vent cap 80 thereto the fluid vessel 20; pre-drilling a hose aperture 110 at a desired location therein the vehicle 100 with which to insert the third hose 81; mounting the flange 82 thereto the vehicle 100 being centered thereupon the pre-drilled hose aperture 110 using the provided fastener assemblies 70; routing the third hose 81 therefrom the fluid vessel 20 thereto the flange 82; inserting an end portion of the third hose 81 therein the flange 82; utilizing the apparatus 10 for urination as described above; and; benefiting from reduced odors emitted therefrom the apparatus 10 using the alternate vent arrangement.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A sanitary collection vessel assembly, comprising:
  inlet fluid plumbing, having a first hose and a second hose having a flanged portion;
  a receiver in fluid communication therewith said fluid plumbing, having a receiving orifice and a receiver attachment for removable attachment thereto said fluid plumbing;
  a fluid vessel in fluid communication therewith said fluid plumbing, comprising a front side and a rear side and a capacity; and,
  a mounting means for removably mounting said fluid vessel thereto a support structure;
  wherein said fluid vessel retains therein an amount of fluid contents for subsequent removal such that said fluid vessel is reusable;
  wherein said mounting means provides a secure removable attachment of said fluid vessel thereto said support structure;
  wherein said sanitary collection vessel assembly is particularly useful for a user who does not have access to restroom facilities or refuse containers;
  a fluid control means removably attachable and interconnected thereto said first hose and said second hose, wherein said fluid control means provides a one-handed operation by said user;
  wherein said fluid control means further comprises an in-line valve being located in close proximity thereto said receiver;
  wherein said receiver comprises a catheter device made of flexible latex such that it conforms thereto a member of said user and comprises a nipple providing a normal friction attachment thereto said second hose;
  wherein said fluid vessel further comprises
  a hose connector extending upward from an upper surface of said fluid vessel;
  a hose connector cap comprising a sealed removable connection of said flanged portion of said first hose to said hose connector, thereby providing fluid communication;
  a first tethered cap tethered thereto said hose connector for removable attachment thereto;
  a pair of handles comprising molded depressions located thereat opposing side surfaces integral thereof said front side;
  a plurality of internal baffles, comprising internal parallel vertical panels extending therebetween opposing side wall portions and suspended approximately two (2) inches thereabove a floor portion of said fluid vessel;
  a fluid level indicator; and,
  a first holding means located on an exterior rear surface of said fluid vessel;
  wherein said first tethered cap provides a closure means thereto said fluid vessel during temporary or permanent removal of said first hose therefrom;
  wherein said pair of handles provides an easy manipulation of said fluid vessel;
  wherein said plurality of internal baffles provide an arresting of excessive fluid movement therewithin said fluid vessel;
  wherein said fluid level indicator provides a quick visual indication of an amount of fluid contents collected therein;
  wherein said mounting means further comprise
  a mounting bracket, comprising a unitary "U"-shaped sheet metal structure and further comprising:
    an upper horizontal member further comprising a clearance slot at an intermediate position;
    a lower horizontal member, further comprising a pair of retaining curbs formed at right angles along outer edges thereof; and, a connecting vertical rear member further comprising a plurality of equally-spaced mounting apertures and a plurality of second holding means being located along inner surfaces of said rear member;

wherein said upper horizontal member extends thereover and against an upper surface of said fluid vessel, thereby exerting a downward clamping force thereupon said fluid vessel to hold it in a stationary manner thereagainst said lower member portion of said mounting bracket;

wherein said clearance slot allows said hose connector cap to protrude upwardly and slide out of said mounting bracket during removal thereof said fluid vessel;

wherein said retaining curbs provide additional lateral stability thereto said fluid vessel when inserted therein;

a plurality of equally-spaced mounting apertures enabling said mounting bracket to be mounted thereto a support structure with a plurality of fasteners; and, wherein said first holding means of said fluid vessel correspondingly mate therewith said second holding means thereof said mounting bracket, thereby providing said secure removable attachment.

2. The assembly of claim 1, further comprising:
a vent connector located on an opposing upper surface therefrom said hose connector;
a second tethered cap having a vent portion tethered thereto said vent connector for removable attachment thereto;
an internal float valve;
wherein said vent portion of said second tethered cap and internal float valve provide a ventilation means and a containment means thereby preventing accidental spilling of said fluid contents due to violent motion or said fluid contents exceeding said capacity of said fluid vessel;
wherein said internal float valve is lifted due to buoyancy, thereby sealing against an internal seat to block a flow of said fluid contents therefrom said fluid vessel;
wherein said second tethered cap provides a closure means thereto said fluid vessel during temporary or permanent removal of said first hose therefrom;
wherein said second tethered cap when removed, provides a cleaning means thereto said fluid vessel; and,
a sanitary pack, comprising a box-like package comprising:
a plurality of receivers therein receiver packaging;
a plurality of pre-moistened wipes therein wipe packaging;
a flushing bulb, comprising a spherically-shaped flexible bulb; and,
a container comprising a liquid disinfectant;
wherein said pre-moistened wipes provide a disinfecting wiping means for said user and assembly as needed;
wherein said liquid disinfectant is dispensed therefrom said container therein said flushing bulb;
wherein said flushing bulb provides a means to manually flush all internal and external surfaces of said assembly therewith said liquid disinfectant; and,
wherein said sanitary pack provides a packaged cleaning and sanitizing means allowing application thereto said user and said assembly.

3. The assembly of claim 2, wherein said first hose and second hose each comprise a hospital-grade product made of a flexible and chemical resistant material.

4. The assembly of claim 3, wherein said fluid vessel is envisioned to be made of a transparent or translucent chemically-resistant plastic construction.

5. The assembly of claim 4, wherein said capacity of said fluid vessel provides an internal volume of approximately one (1) to three (3) quarts.

6. The assembly of claim 5, wherein said fluid level indicator comprises a plurality of molded-in protruding graduated lines with level indicating indicia along one (1) or more side surfaces of said fluid vessel.

7. The assembly of claim 6, wherein said first holding means and said second holding means further comprise correspondingly matable hook-and-loop fabric strips.

8. The assembly of claim 1, further comprising:
a vent connector located on an opposing upper surface therefrom said hose connector;
a third tethered cap having a vent portion tethered thereto said vent connector for removable attachment thereto;
a third hose removably and sealably attached thereto said fluid vessel via said third tethered vent cap; and,
a mounting flange for mounting said third hose thereto said support structure therewith mounting fasteners;
wherein said third hose extends a variable distance therefrom the third tethered cap subsequently passing down through said mounting flange; and,
wherein said vent portion of said third tethered cap and said third hose provide an effective redirection and removal of offensive odors emitted therefrom said assembly.

9. The assembly of claim 8, wherein said mounting flange is mounted above a pre-drilled hose aperture therein said support structure;
wherein said third hose extends therethrough said pre-drilled hose aperture to redirect and remove offensive odors emitted therefrom said assembly.

10. The assembly of claim 9, further comprising a sanitary pack, comprising a box-like package comprising:
a plurality of receivers therein receiver packaging;
a plurality of pre-moistened wipes therein wipe packaging;
a flushing bulb, comprising a spherically-shaped flexible bulb; and,
a container comprising a liquid disinfectant;
wherein said pre-moistened wipes provide a disinfecting wiping means for said user and assembly as needed;
wherein said liquid disinfectant is dispensed therefrom said container therein said flushing bulb;
wherein said flushing bulb provides a means to manually flush all internal and external surfaces of said assembly therewith said liquid disinfectant; and,
wherein said sanitary pack provides a packaged cleaning and sanitizing means allowing application thereto said user and said assembly.

11. The assembly of claim 10, wherein said first hose, said second hose, and said third hose each comprise a hospital-grade product made of a flexible and chemical resistant material.

12. The assembly of claim 11, wherein said fluid vessel is envisioned to be made of a transparent or translucent chemically-resistant plastic construction.

13. The assembly of claim 12, wherein said capacity of said fluid vessel provides an internal volume of approximately one (1) to three (3) quarts.

14. The assembly of claim 13, wherein said fluid level indicator comprises a plurality of molded-in protruding graduated lines with level indicating indicia along one (1) or more side surfaces of said fluid vessel.

15. The assembly of claim 14, wherein said first holding means and said second holding means further comprise correspondingly matable hook-and-loop fabric strips.

* * * * *